(12) United States Patent
Grubbs

(10) Patent No.: US 9,760,637 B2
(45) Date of Patent: *Sep. 12, 2017

(54) WILDCARD SEARCH IN ENCRYPTED TEXT USING ORDER PRESERVING ENCRYPTION

(71) Applicant: Skyhigh Networks, Inc., Campbell, CA (US)

(72) Inventor: Paul Grubbs, Ithaca, NY (US)

(73) Assignee: Skyhigh Networks, Inc., Campbell (CA)

( * ) Notice: Subject to any disclaimer, the term of this patent is extended or adjusted under 35 U.S.C. 154(b) by 80 days.

This patent is subject to a terminal disclaimer.

(21) Appl. No.: 14/852,029

(22) Filed: Sep. 11, 2015

(65) Prior Publication Data

US 2017/0078251 A1    Mar. 16, 2017

(51) Int. Cl.
*H04L 29/06*    (2006.01)
*G06F 17/30*    (2006.01)

(52) U.S. Cl.
CPC .... *G06F 17/30864* (2013.01); *H04L 63/0281* (2013.01); *H04L 63/0471* (2013.01)

(58) Field of Classification Search
CPC ............. H04L 63/0428; H04L 63/0281; H04L 63/0471; H04L 9/0693; G06F 17/30864; G06F 17/3053; G06F 17/30038
See application file for complete search history.

(56) References Cited

U.S. PATENT DOCUMENTS

| | | | |
|---|---|---|---|
| 6,119,120 A * | 9/2000 | Miller | G06F 7/02 |
| 8,930,691 B2 | 1/2015 | Kamara et al. | |
| 9,047,480 B2 | 6/2015 | Kahol et al. | |
| 2010/0306221 A1* | 12/2010 | Lokam | G06F 17/30631 707/759 |
| 2015/0154418 A1* | 6/2015 | Redberg | G06F 17/30106 713/165 |

OTHER PUBLICATIONS

"Data-at-Rest Encryption Solutions", Brocade Communications Sytems, Inc., 2013, pp. 1-13.*

(Continued)

*Primary Examiner* — Joseph P Hirl
*Assistant Examiner* — Chi Nguy
(74) *Attorney, Agent, or Firm* — Van Pelt, Yi & James LLP

(57) ABSTRACT

A encrypted text wildcard search method enables wildcard search of encrypted text by using a permuterm index storing permuted keyword strings that are encrypted using an order preserving encryption algorithm. The permuted keyword strings are encrypted using an order preserving encryption algorithm or a modular order preserving encryption algorithm and stored in the permuterm index. In response to a search query containing a wildcard search term, the encrypted text wildcard search method transforms the wildcard search term to a permuted search term having a prefix search format. The permuted search term having the prefix search format is then used to perform a range query of the permuterm index to retrieve permuted keyword strings having ciphertext values that fall within the range query. In some embodiments, the encrypted text wildcard search method enables prefix search, suffix search, inner-wildcard search, substring search and multiple wildcard search of encrypted text.

14 Claims, 10 Drawing Sheets

(56) References Cited

OTHER PUBLICATIONS

Boldyreva et al.,"Order-Preserving Symmetric Encryption," Advances in Cryptology—Eurocrypt 2009 Proceedings, Lecture Notes in Computer Science vol. 5479, pp. 224-241, A. Joux ed., 2009.
Boldyreva et al., "Order-Preserving Encryption Revisited: Improved Security Analysis and Alternative Solutions," Advances in Cryptology—CRYPTO 2011, 31st Annual International Cryptology Conference, P. Rogaway ed., LNCS, Springer, 2011.
Boldyreva et al., "Order-Preserving Encryption Revisited: Improved Security Analysis and Alternative Solutions," Advances in Cryptology—Crypto 2011 Proceedings, Lecture Notes in Computer Science, Ph. Rogaway ed., 2011.
Mavoforakis et al., Modular Order-Preserving Encryption, Revisited, SIGMOD, 2015.
Cash et al. "Dynamic searchable encryption in very-large databases: Data structures and implementation." Network and Distributed System Security Symposium, NDSS. vol. 14. 2014.

\* cited by examiner

Search Term Transformation

Prefix Search ⟋170

| Original Query | Permuted Query |
|---|---|
| he* | $he* |

Suffix Search ⟋172

| Original Query | Permuted Query |
|---|---|
| *lo | lo$* |

Inner-Wildcard Search ⟋174

| Original Query | Permuted Query |
|---|---|
| he*lo | lo$he* |

Substring Search ⟋176

| Original Query | Permuted Query |
|---|---|
| *el* | el* |

Multiple Wildcard Search ⟋178

| Original Query | Permuted Query |
|---|---|
| h*l*o | o$h* |

Search String Formation

Min Possible Ciphertext: MOPE[$heaaaa] = 1237761
Max Possible Ciphertext: MOPE[$hezzzz] = 1239215

Min Possible Ciphertext: MOPE[lo$aaaa] = 6524877
Max Possible Ciphertext: MOPE[lo$zzzz] = 6527316

Min Possible Ciphertext: MOPE[lo$heaaaa] = 4451247
Max Possible Ciphertext: MOPE[lo$hezzzz] = 4451536

Min Possible Ciphertext: MOPE[elaaaa] = 2233648
Max Possible Ciphertext: MOPE[elzzzz] = 2249215

Min Possible Ciphertext: MOPE[o$haaaa] = 6928563
Max Possible Ciphertext: MOPE[o$hzzzz] = 6928864
(Filter results for those that also contain "l")

FIG. 6

Algorithm 1 Insert the value $str$ into the encrypted permuterm index.

$S \leftarrow Permuterm(str)$
for all $s \in S$ do
　　$s' \leftarrow MOPE(k, Pad(s, len))$
end for

---

Algorithm 2 Search the query $q$ in the encrypted permuterm index.

$LowerQ \leftarrow MOPE(k, LowerPad(q, len))$
$UpperQ \leftarrow MOPE(k, UpperPad(q, len))$
$Results \leftarrow RangeQ(DB, LowerQ, UpperQ)$
return $Results$

Fig. 10

WILDCARD SEARCH IN ENCRYPTED TEXT USING ORDER PRESERVING ENCRYPTION

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

With cloud-based services coming into widespread use, data security for data and files stored on the cloud-based service providers become an important issue. In particular, cloud-based data storage has also come into widespread use. With more and more user data and files being stored in cloud-based data storage, data security for data and files stored on the cloud-based storage data has become an important issue.

BRIEF SUMMARY OF THE INVENTION

In embodiments of the present invention, a method for performing wildcard search of encrypted cloud stored data includes receiving, at a network intermediary, a document destined for a cloud service provider; encrypting, at a network intermediary, the document using a document encryption algorithm; generating a set of permuted keyword strings for each of some or all of the keywords in the document, the set of permuted keyword strings for each keyword being generated by adding a first character delimiter before the first character of the keyword and applying cyclic rotation of the characters of the keyword, including the first character delimiter; encrypting the permuted keyword strings using an order preserving encryption algorithm; storing the encrypted permuted keyword strings in a database; and transmitting the encrypted document to the cloud service provider.

In some embodiments, the method further includes receiving, at a network intermediary, a search request with a search term directed to encrypted documents stored in a cloud service provider, the search term comprising a wildcard search term; transforming the wildcard search term to a permuted search term having a prefix search format; generating a minimum possible plaintext string using the permuted search term as prefix and padding the permuted search term to a first character length using one or more trailing characters indicative of a minimum possible value related to the search term; generating a maximum possible plaintext string using the permuted search term as prefix and padding the permuted search term to the first character length using one or more trailing characters indicative of a maximum possible value related to the search term; encrypting the minimum possible plaintext string and the maximum possible plaintext string using the order-preserving encryption algorithm used to encrypt the permuted keyword strings; generating a minimum ciphertext from the minimum possible plaintext string and a maximum ciphertext from the maximum possible plaintext string; determining a set of common leading digits from the minimum ciphertext and the maximum ciphertext; generating a range query including the set of common leading digits; sending the range query to the database of encrypted permuted keyword strings; and receiving a search result from the database including encrypted permuted keyword strings having ciphertext values that fall within the range query.

BRIEF DESCRIPTION OF THE DRAWINGS

Various embodiments of the invention are disclosed in the following detailed description and the accompanying drawings.

FIG. 6 illustrates the transformation of search queries using the encrypted text wildcard search method in some examples.

FIG. 10 illustrates example pseudocodes which can be used to implement the encrypted text wildcard search method in embodiments of the present invention.

DETAILED DESCRIPTION

Figure 1:
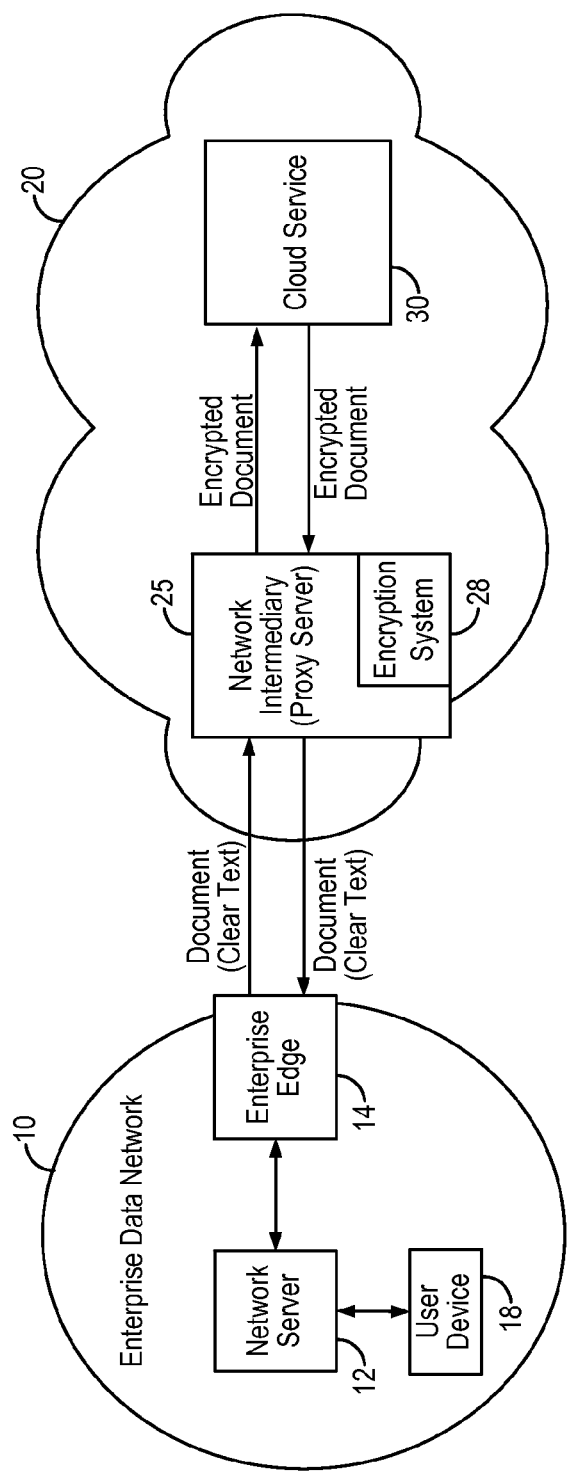
FIG. 1 is a block diagram illustrating a network intermediary implementing encryption of cloud data on behalf of an enterprise in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a method enables wildcard search of encrypted text by using a permuterm index storing permuted keyword strings that are encrypted using an order preserving encryption algorithm. More specifically, the encrypted text wildcard search method stores permuted keyword strings of keywords from the encrypted text where the permuted keyword strings (also referred to as permuterms) are encrypted using an order preserving encryption algorithm or a modular order preserving encryption algorithm. In response to a search query containing a wildcard search term, the encrypted text wildcard search method transforms the wildcard search term to a permuted search term having a prefix search format. The permuted search term having the prefix search format is then used to perform a range query of the permuterm index to retrieve encrypted permuted keyword strings having ciphertext values that fall within the range defined by the permuted search term as the search result. The ciphertext search result (or the encrypted permuted keyword strings) can be further processed or applied to other algorithm to retrieve the encrypted document that contains the desired search term. In some embodiments, the encrypted text wildcard search method enables prefix search, suffix search, inner-wildcard search, substring search and multiple wildcard search of encrypted text.

In the present description, the term "keyword" refers to any word in a document or a file or a data field and can include one or more characters of the English alphabet (lower case and uppercase letters), numbers 0-9, punctuation symbols, alphabet and symbols of languages other than English, and other ASCII characters. In the present description, the term "wildcard" refers to a character that will match any character or sequence of characters in a search.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, in the present description, "cloud content" or "cloud data" refers to data or files being processed or stored on a cloud-based service on behalf of an enterprise. The cloud-based service may be a cloud storage service, customer relationship management (CRM) services, information technology (IT) services or other types of cloud services. The cloud data or content may be stored as data files or in other formats.

In the present description, order-preserving encryption (OPE), also referred to as order-preserving symmetric encryption, is a deterministic encryption scheme using an encryption function that preserves the sort order of the plaintexts. In the present description, sort order refers to the alphabetical or numerical or alpha-numerical ordering of the plaintexts. More specifically, OPE encryption algorithms generate ciphertexts that preserve the sort order of the corresponding plaintexts. For example, let $F(t)$ be an order preserving encryption function, for plaintext values $t1$ and $t2$ where $t1<t2$ in the sort order, the OPE function will generates $F(t1)$ and $F(t2)$ where $F(t1)<F(t2)$. When an OPE encryption algorithm is used, encrypted data or ciphertexts stored in a database may be indexed or queried and the database table returns stored encrypted data or ciphertext whose decrypted value fall within the range of the query request. An example OPE implementation is described in A. Boldyreva, et al., "Order-Preserving Symmetric Encryption," Advances in Cryptology—CRYPTO 2011, $31^{st}$ Annual International Cryptology Conference, P. Rogaway ed., LNCS, Springer, 2011, which reference is incorporated herein by reference in its entirety.

In the present description, modular order-preserving encryption (MOPE) is an extension of the order-preserving encryption algorithm where a secret modular offset is added to the plaintext before encryption using an order-preserving encryption algorithm. Modular order-preserving encryption improves the security performance of any OPE algorithms. The resulting encryption is no longer strictly order-preserving, however, MOPE still supports range queries. In some examples, MOPE is performed by padding the keyword to a fixed, constant length. The padding can use a smallest or minimum value character of the character set. With keywords thus padded to the same fixed length before encryption, the encrypted keywords will have the correct numeric sort order in ciphertext as in the lexicographic or alpha-numeric sort order of the plaintext.

With the proliferation of cloud-based services, an enterprise may wish to adopt one or more cloud-based services for data storage or other applications. Furthermore, the enterprise may deploy security measures to monitor and control the use of the cloud-based services from the enterprise's own private data network or by the enterprise's employees and users. In some cases, an enterprise data network redirects network traffic between a client device and a cloud-based service through a network intermediary. The client device may be situated within the enterprise data network or be associated with the enterprise. The network intermediary may provide monitoring and assessment of the enterprise's cloud usage. In some cases, the network intermediary is used to provide additional security function, such as file encryption for uploaded data. For instance, the network intermediary may be used to provide encryption of sensitive data to be stored in a cloud service provider.

FIG. 1 is a block diagram illustrating a network intermediary implementing encryption of cloud data on behalf of an enterprise in some embodiments. Referring to FIG. 1, an enterprise may operate an enterprise data network 10 including one or more network servers 12 communicating with one or more user devices 18. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as a cloud service provider 30, that are deployed on the public data network 20. Network traffic from the user device 18 is sent to the network server 12 and travels to the enterprise network edge 14 and then onto the cloud service providers. Network traffic from the cloud service providers are received at the enterprise network edge 14 and then transmitted onto the network server 12 to be distributed to the user device 18.

To ensure security associated with the use of one or more cloud based services, the enterprise may redirect all network traffic destined for one or more cloud service providers through a network intermediary 25, which can be implemented as a network proxy server. In the present description, a proxy server refers to a server, which can be a computer system or a software application, that acts as an intermediary for requests from clients seeking resources from other servers. The network intermediary 25 may be configured as reverse/forward proxies. Thus, requests and data from the user device are intercepted by the network intermediary 25 before reaching the cloud service provider 30. In embodiments of the present invention, the network intermediary 25 performs encryption of the data before sending the data onto the cloud service. The cloud-based service may be a cloud storage service, customer relationship management (CRM) services, information technology (IT) services or other types of cloud services. In one embodiment, the network intermediary 25 is a cloud-based service and may be deployed on the publicly accessible Internet, such as public data network 20. In other embodiments, the network intermediary 25 may be deployed on a private data network of an enterprise, or be deployed on a third party private data network.

In the present description, the terms "file", "document" and "data" will be used interchangeably to refer to files or documents or data in any format that is being exchanged in the network environment described herein. "Data" as used herein can be structured data (emails, data records with name-value pairs) or unstructured data (word files, spreadsheet files). In the present example, the cloud-based service 30 may be a cloud storage service, such as Box.com or collaboration services, such as Office 365. The cloud-based service 30 may also be a customer relationship management (CRM) service, information technology (IT) service or other types of cloud services. The information being exchanged in the network environment described herein can include data of any format, such as files, documents, emails, or data records of a cloud based service.

More specifically, in the present description, each data object to be encrypted is treated as a "document." A document can be data of any format, including unstructured data such as a file, or structured data such as an email or a data record or a data field in a data record. In some examples, a data field in a data record may contain one or more keywords that can be encrypted and such data field will be treated as a "document" in the present description. In other examples, a data record may contain two or more data fields, of which a portion of the data fields can be encrypted. In that case, each data field that can be encrypted in the data record will be treated as a document. As an example, a data record can be an Event data record or a Contact data record in Salesforce.com.

In some embodiments, the network intermediary 25 performs encryption of documents before sending the documents onto the cloud service provider 30. Accordingly, in some embodiments, the network proxy server 25 includes an encryption system 28 which encrypts and decrypts file content based on one or more encryption algorithms. The content to be encrypted can be a file or list of words from the file. The encryption system 28 may utilize keys, algorithms, pseudo random number generators and encoding algorithms suitable for encrypting the documents from the user device. In some embodiments, the encryption system 28 may encrypt all or part of the document, file or data being transmitted to the cloud service provider.

As thus configured, a user in an enterprise data network 10, wishing to use a cloud-based data storage service provider 30 for storing data or files, uses a computing device 18 to access the cloud service provider 30. The user's request is redirected to the network proxy server 25 acting as the network intermediary. The network proxy server 25 may be configured as reverse/forward proxies. Thus, requests and documents from the user are intercepted by the network proxy server 25 before reaching the cloud service provider 30. The data or files (or documents) of the user are sent to the network proxy server 25 in clear text or plaintext. The network proxy server 25 performs, among other things, encryption of the document before sending the encrypted document onto the cloud service provider for storage. In this manner, data security is ensured as the data and files are stored on the cloud service provider 30 as encrypted data and any one accessing the cloud content on the cloud service provider directly will only see encrypted data. When the encrypted document is to be retrieved from the cloud service provider 30, the network intermediary 25 retrieves the encrypted document and also decrypts the document. The decrypted document is then provided to the user device 18 through the enterprise data network 10. With the use of the network intermediary 25 including the encryption system 28, the enterprise makes use of cloud based services with the security of the cloud data and content being encrypted at rest.

While file-level encryption ensures data security, encryption prevents the stored files from being searched using the cloud service provider's native search routine. For example, cloud-based storage services typically provides search option where the stored files can be searched for keywords using the cloud service's native search routine and this search functionality will not work if the files are encrypted. Methods for enabling searching of encrypted text have been described. For example, searchable symmetric encryption (SSE) algorithms have been described which enables exact match searching in encrypted text. For example, Cash et al. described searchable encryption in the publications entitled "Highly-Scalable Searchable Symmetric Encryption with Support for Boolean Queries" and "Dynamic Searchable Encryption in Very-Large Databases: Data Structures and Implementation," published in CRYPTO 2013 and NDSS 2014, respectively, which publications are incorporated herein by reference in their entireties. In another example, copending and commonly assigned U.S. patent application Ser. No. 14/738,473, entitled "Prefix Search in Encrypted Text," by the same inventor hereof, describes a method to perform prefix searching of encrypted text by encrypting using an order preserving encryption algorithm. The '473 patent application in incorporated herein by reference in its entirety.

In embodiments of the present invention, an encrypted text wildcard search method is implemented to enable wildcard searching of encrypted text through the use of a permuterm index storing permuted keyword strings that are encrypted using an order preserving encryption algorithm. In some embodiments, the permuterm index is a database that is provided on the proxy server 25. In other embodiments, the permuterm index is a database that is provided on a data network and is in communication with the proxy server 25.

Figure 2:
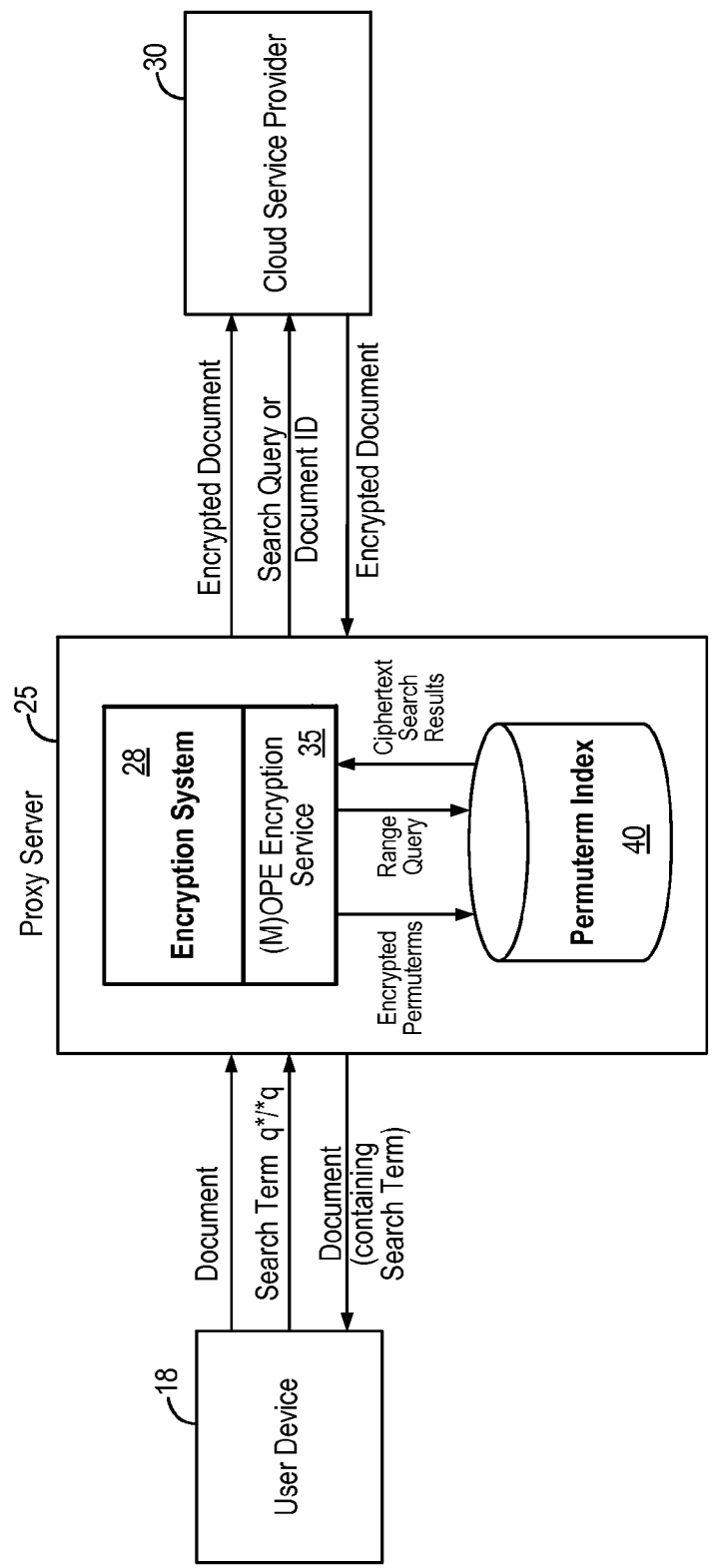
FIG. 2 is a block diagram of a network intermediary incorporating an encryption system implementing the encrypted text wildcard search method in embodiments of the present invention.

FIG. 2 is a block diagram of a network intermediary incorporating an encryption system implementing the encrypted text wildcard search method in embodiments of the present invention. In some embodiments, the encrypted text wildcard search method is implemented in the encryption system 28 of the proxy server 25. Referring to FIG. 2, the encryption system 28 receives files or documents in plaintext from the user device 18 in the enterprise data network and encrypts the documents using an encryption algorithm and forwards the encrypted documents to the cloud service provider 30 for storage. In the present description, the encryption algorithm used to encrypt the document for storage in the cloud service provider is sometimes referred to as the "document encryption algorithm." In some embodiments, the document encryption algorithm for encrypting the document is a deterministic encryption algorithm. In other embodiments, the document encryption algorithm for encrypting the document is an AES256-GCM authenticated encryption algorithm.

Meanwhile, the encryption system 28 implements the encrypted text wildcard search method of the present invention to enable wildcard searching of the encrypted text. Accordingly, the encrypted encryption system 28 processes the document to generate permuted keyword strings (or permuterms) for some or all of the keywords in the document. More specifically, for each keyword in the document, the encryption system 28 generates a set of permuted keyword strings by performing cyclic rotation of the characters in the keyword. In some embodiments, the encrypted encryption system 28 processes each keyword by adding a first character delimiter to demarcate the beginning of the keyword. The encryption system 28 includes an order preserving encryption (OPE) encryption service 35 for encrypting the permuted keyword strings thus generated. In some embodiments, the OPE encryption service 35 implements a traditional order preserving encryption algorithm. In the present embodiment, the OPE encryption service implements a modular order preserving encryption (MOPE) algorithm for added security. Accordingly, the OPE encryption service 35 is sometimes referred to as the MOPE encryption service 35.

As a result of the processing under the encrypted text wildcard search method, permuterms that are OPE encrypted are generated for some or all of the keywords in the document. The encryption system 28 stores the permuterms in the permuterm index 40. The permuterm index 40 is used for wildcard searching of the encrypted text stored in the cloud service provider 30. When a search of the encrypted files is to be executed, the encrypted text wildcard search method receives a wildcard search term in plaintext or clear text from a user device 18. The encrypted text wildcard search method transforms the search term to a permuted search term having a prefix search format. The permuted search term is then used to perform a range query on the permuterm index 40. Because the ciphertexts stored in the permuterm index 40 have been encrypted using an order preserving encryption algorithm, a prefix search of OPE encrypted ciphertexts can be performed as a range query of ciphertext values.

The permuterm index 40 returns encrypted permuted keyword strings having ciphertext values that fall within the range of the range query as the ciphertext search result. Post processing can then be applied to the ciphertext search result containing the encrypted permuted keyword strings to identify the document(s) containing the search term. The post processing can include decrypting and unpermuting the retrieved permuted keyword strings. The proxy server 25 can then perform further query to identify the relevant documents. The proxy server 25 fetches the encrypted document(s) from the cloud service provider 30 and decrypts the document. The decrypted document(s) are provided to the user device 18 requesting the search.

The operation of the encrypted text wildcard search method will be described in more detail below with reference to the flowcharts in FIGS. 3 and 5.

Figure 3:
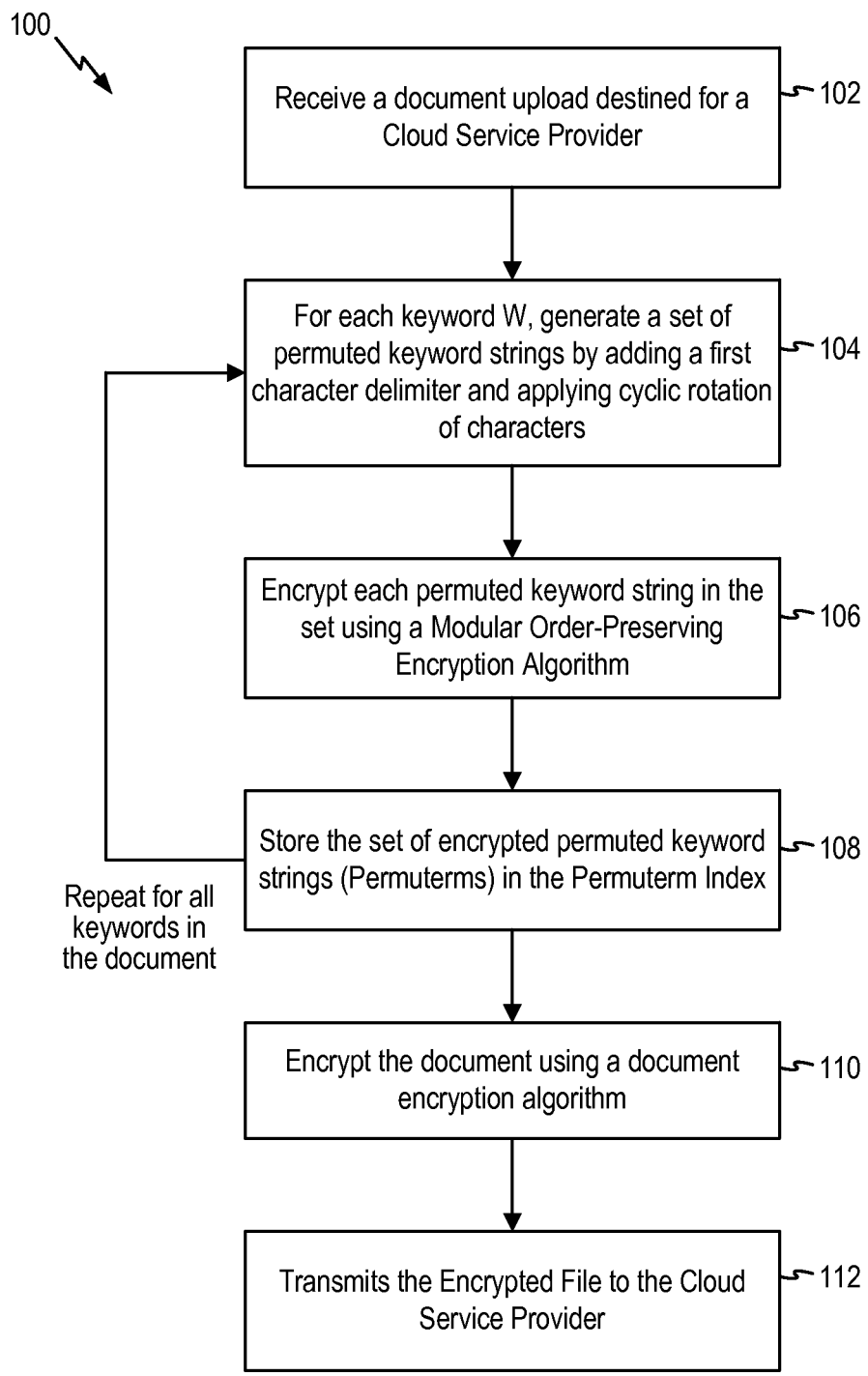
FIG. 3 is a flowchart illustrating the encrypted text wildcard search method performing encryption and indexing in embodiments of the present invention.

FIG. 3 is a flowchart illustrating the encrypted text wildcard search method performing encryption and indexing in embodiments of the present invention. The encrypted text wildcard search method may be implemented in the network proxy server 25 of FIG. 1 or 2 in embodiments of the present invention. More specifically, in some embodiments, the encrypted text wildcard search method may be implemented in the encryption system 28 of the network proxy server 25. Referring to FIG. 3, the encrypted text wildcard search method 100 starts when the network proxy server receives a file upload from a user device destined for a cloud service provider (102). For example, the network proxy server may intercept a file upload from a user within an enterprise data network to a cloud service provider. Instead of allowing the user to upload the file directly to the cloud service provider, the file is uploaded to the network proxy server.

The encrypted text wildcard search method 100 processes the document to generate permuterms for some or all of the keywords in the document. Accordingly, for each keyword W in the document, the method 100 generates a set of permuted keyword strings or "permuterms" by adding a first character delimiter and then applying cyclic rotation of the characters in the keyword (104). More specifically, the first character delimiter is added before the first character of the keyword to demarcate the beginning of the keyword. For example, the first character delimiter can be "$" or other special character in the available character set. Then, the characters of the keyword, including the first character delimiter, are rotated cyclically one character at a time, in a round ribbon fashion, to generate the set of permuted keyword strings for the keyword. The method 100 then encrypts each permuted keyword string in the set using an order preserving encryption algorithm (106). In the present embodiment, a modular order preserving encryption algorithm is used. In other embodiments, a traditional order preserving encryption algorithm may be used. The method 100 then stores the resulting encrypted permuterms in the permuterm index (108).

Figure 4:
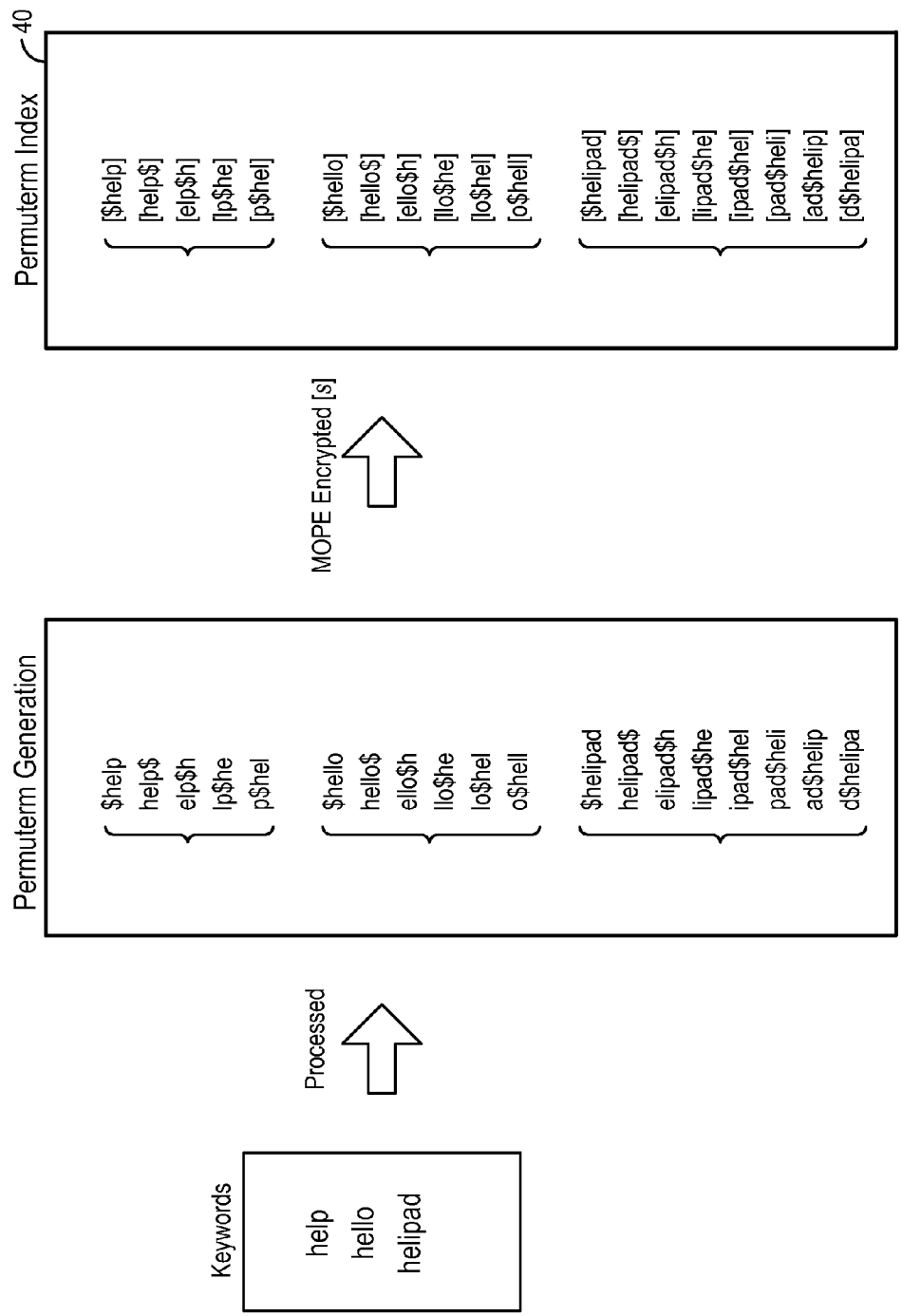
FIG. 4 illustrates the processing of keywords to generate sets of permuterms which are stored in the permuterm index in some examples.

FIG. 4 illustrates the processing of keywords to generate sets of permuterms which are stored in the permuterm index in some examples. Referring to FIG. 4, it is assumed that the document received contains the keywords "help", "hello", and "helipad". The encrypted text wildcard search method 100 processes the keywords by adding a first character delimiter, for example "$", in front of the first character of the keyword. Thus, the permuterms "$help", "$hello", and "$helipad" are generated. Then, encrypted text wildcard search method 100 performs cyclic rotation of the permuterms to generate a set of permuted keyword strings for each keyword. For example, a set of permuted keyword strings is generated for the permuterm "$help" including: "help$", "elp$h", "lp$he", "p$hel". A set of permuted keyword stings is generated for the permuterm "$hello" and another set of permuted keyword stings is generated for the permuterm "$helipad", as shown in FIG. 4. Then, the encrypted text wildcard search method 100 encrypts the permuted keyword strings, or permuterms, using a modular order preserving encryption algorithm. The resulting encrypted permuterms, shown as being enclosed in square brackets "[x]", are then stored in the permuterm index 40.

Returning to FIG. 3, the encrypted text wildcard search method 100 repeats the keyword processing, encryption and indexing (104 to 108) for some or all of the keywords in the document. When all the desired keywords have been processed, the method 100 proceeds to encrypt the document using a document encryption algorithm (110). In some embodiments, the document encryption algorithm for encrypting the document is a deterministic encryption algorithm. In other embodiments, the document encryption algorithm for encrypting the document is an AES256-GCM authenticated encryption algorithm. The method 100 transmits the encrypted document to the cloud service provider for storage (112).

As thus configured, the encrypted text wildcard search method 100 ensures that the document uploaded is stored at the cloud service provider being encrypted at rest. Furthermore, the encrypted text wildcard search method 100 generates permuterms stored in the permuterm index to enable wildcard searching of the encrypted text. Importantly, the permuterms stored in the permuterm index are also encrypted so that no information about the encrypted document is leaked from the permuterm index.

Figure 5:
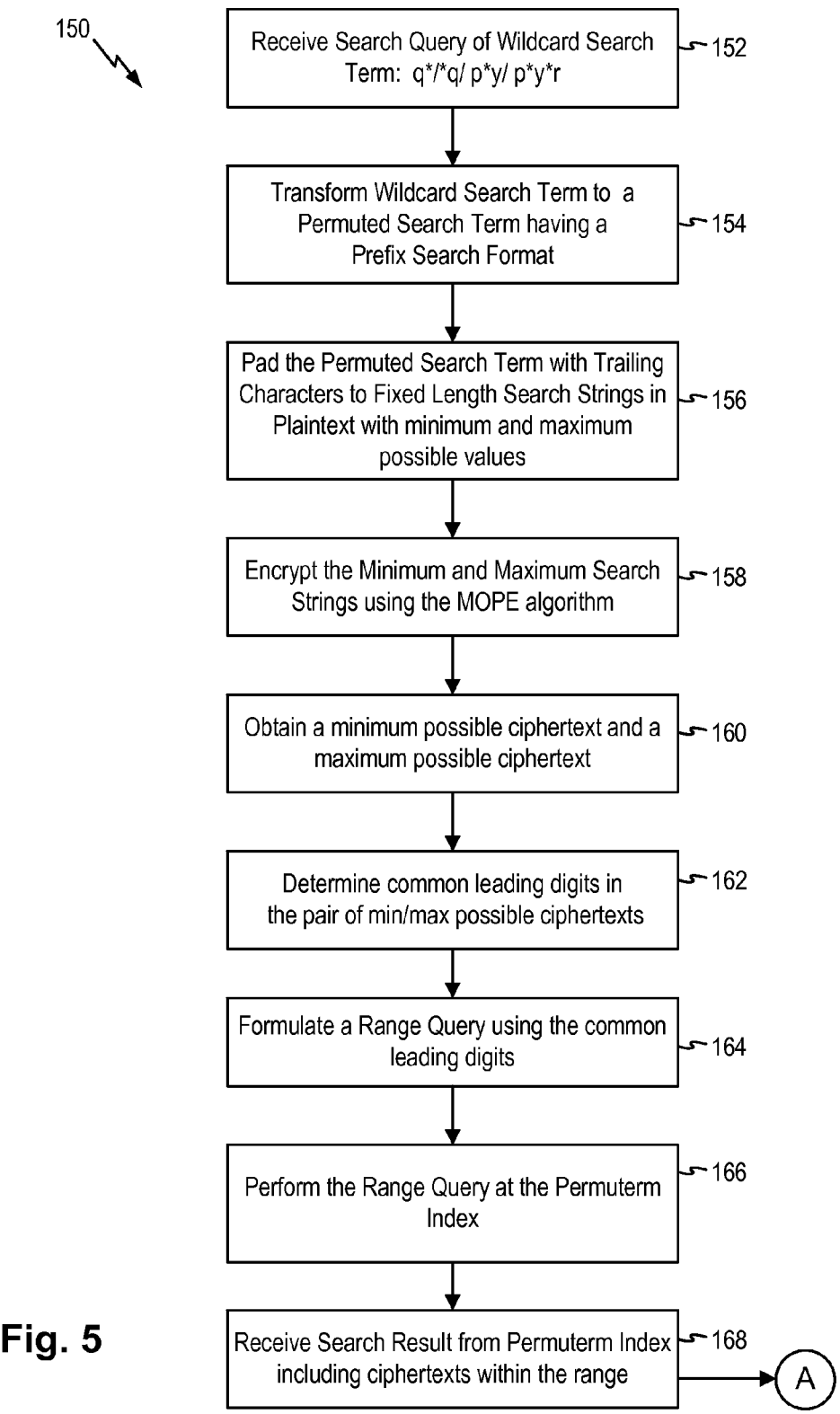
FIG. 5 is a flowchart illustrating the encrypted text wildcard search method performing a search query using the permuterm index in embodiments of the present invention.

FIG. 5 is a flowchart illustrating the encrypted text wildcard search method performing a search query using the permuterm index in embodiments of the present invention. The operation of the encrypted text wildcard search method for performing a search will be described with reference to FIG. 6. FIG. 6 illustrates the transformation of search queries using the encrypted text wildcard search method in some examples. Referring to FIG. 5, an encrypted text wildcard search method 150 provides the process for executing a wildcard search of the cloud stored documents using the permuterm index 40 in FIG. 2. To perform a wildcard search, the method 150 receives a search query including a wildcard search term from a user device (152). The wildcard search term can be a prefix search term (q*), a suffix search term (*q), an inner-wildcard search term (p*y), and multiple wildcard search term (p*y*r), where "*" represents wildcard.

The method 150 transforms the wildcard search term to a permuted search term having a prefix search format (154). More specifically, the method 150 transforms the wildcard search term so that the wildcard term is at the end of the search string, regardless of what the original search query is. When the search string has the wildcard term at the end, the search string becomes a prefix search string and the prefix search can be carried out as a range query on the OPE encrypted permuterms stored in the permuterm index 40.

Examples of the wildcard search term transformations are shown in FIG. 6. Referring to FIG. 6, when the search query is a prefix search, for example "he*", the wildcard search term is already in the desired prefix search format with the wildcard term at the end of the search string. The method 150 adds the first character delimiter before the first character of the prefix search term and the permuted search term is formed as "$he*", as shown in box 170.

When the search query is a suffix search, for example "*lo", the wildcard search term is transformed to the prefix search format by adding the first character delimiter at the end of the search string and then permuting the characters of the search string so that the wildcard term is at the end of the search string. In this case, the search term is "wrapped around" and the first character delimiter is used to mark the end of the character string as the start of the character string is wildcard. Accordingly, the suffix search term "lo" is first modified to "*lo$" and then transformed to "lo$*" with the wildcard term "*" at the end of the search string. The permuted search term thus formed is "lo$*", as shown in box 172.

When the search query is an inner-wildcard search, for example "he*lo", the wildcard search term is transformed to the prefix search format by adding the first character delimiter to the start of the search string and then permuting the characters of the search string so that the wildcard term is at the end of the search string. Accordingly, the inner-wildcard search term "he*lo" is first modified to "$he*lo" and then transformed to "lo$he*" with the wildcard term "*" at the end of the search string. The permuted search term thus formed is "lo$he*", as shown in box 174.

When the search query is a substring search, for example "*el*", the wildcard search term is treated as a prefix search term without the first character delimiter. Accordingly, the substring search term "*el*" is modified to "el*" having the prefix search format, as shown in box 176.

When the search query is a multiple wildcard search, for example "h*l*o", the multiple wildcard search term is transformed to the prefix search format by adding the first character delimiter to the start of the search string and then permuting the characters of the search string so that the first wildcard term is at the end of the search string. The remaining wildcard terms are then ignored. Accordingly, the multiple wildcard search term "h*l*o" is first modified to "$h*l*o" and then transformed to "o$h*", as shown in box 178. After the range query using the permuted search term "o$h*", post processing is performed to remove the incorrect results. For example, the search results are further processed or filtered to obtain those search results that only contain the additional search limitations, such as "l".

Returning to FIG. 5, with the permuted search term thus generated from the wildcard search term, the method 150 continues with generating a pair of minimum and maximum search strings from the permuted search term (156). More specifically, method 150 generates based on the permuted search term a maximum possible plaintext search string and a minimum possible plaintext search string of the same character length including the search term as the prefix. In particular, the two plaintext search strings are generated by using the permuted search term as a prefix and padding the permuted search term with trailing characters to a fixed length with a minimum possible search value and a maximum possible search value associated with the permuted search term. In one example, when the search term is a text string using the English alphabet of one or more characters, the search term is padded with trailing characters to a fixed length using the first character of the English alphabet "a" and using the last character of the English alphabet "z" to generate the two plaintext search strings. For example, the two plaintext strings can be constructed as "Waaaa" and "Wzzzz", where W represents the permuted search term. In other examples, when the search term is a numeric string of one or more characters, the search term is padded with trailing characters to a fixed length using the minimum value "0" and using the maximum value "9" to generate the two plaintext search strings. For example, the two plaintext strings can be constructed as "P000" and "P999", where P represents the permuted search term.

In the present description, the search term can include one or more characters of the English alphabet (lower case and uppercase letters), numbers 0-9, punctuation symbols, alphabet and symbols of languages other than English, and other ASCII characters. The encrypted text wildcard search method pads the permuted search term with minimum and maximum possible values using the same character type of the search term. For example, when the search term is the English alphabet, the minimum and maximum possible values are based on the first and last letter of the alphabet. In some embodiments, the minimum possible value and the maximum possible value associated with a character type is determined based on the ASCII values assigned to that character type.

With the minimum plaintext search string and the maximum plaintext search string thus generated, the encrypted text wildcard search method encrypts the two plaintext search strings using the same MOPE encryption algorithm used to encrypt the permuterms stored in the permuterm index (158). The MOPE encryption generates a minimum possible ciphertext and a maximum possible ciphertext associated with the minimum plaintext search string and the maximum plaintext search string (160). With OPE or MOPE encryption algorithms, character strings with the same prefix will match to the same location in the ciphertext space so that the resulting ciphertexts will have common leading digits. Accordingly, because the minimum plaintext search string and the maximum plaintext search string share the same prefix, the minimum possible ciphertext and the maximum possible ciphertext thus generated will have common leading digits. The encrypted text wildcard search method 150 determines a common ciphertext prefix string being the common leading digits from the minimum possible ciphertext and the maximum possible ciphertext (162).

The encrypted text wildcard search method 150 formulates a range query using the common ciphertext prefix string (164). For example, the range query searches for ciphertexts having ciphertext values between the minimum possible ciphertext and the maximum possible ciphertext. The method 150 then performs the range query at the permuterm index (166). The method 150 receives search result from the permuterm index including ciphertexts having ciphertext values that fall within the range query (168). The ciphertext search result contains encrypted permuted keyword strings.

Examples of the search string generation and the common ciphertext prefix string generation are shown in FIG. 6. Referring again to FIG. 6, the permuted search term "$he*" is padded to a fixed length by using the minimum and maximum values in the English alphabet. Thus, the minimum plaintext search string is "$heaaaa" and the maximum plaintext search string is "$hezzzz". After applying the MOPE encryption, the minimum possible ciphertext thus generated is "1237761" while the maximum possible ciphertext thus generated is "1239215". The minimum possible ciphertext and the maximum possible ciphertext thus share common leading digits of "123". The common ciphertext prefix string "123" is thus used to formulate a range query to search for the permuted keyword strings in the permuterm index.

Other examples of the plaintext search string formation are shown in FIG. 6. For example, for the suffix search, the permuted search term is "lo$*". The permuted search term "lo$*" is padded to a fixed length by using the minimum and maximum values in the English alphabet. Thus, the minimum plaintext search string is "lo$aaaa" and the maximum plaintext search string is "lo$zzzz". After applying the MOPE encryption, the minimum possible ciphertext thus generated is "6524877" while the maximum possible ciphertext thus generated is "6527316". The minimum possible ciphertext and the maximum possible ciphertext thus share common leading digits of "652". The common ciphertext prefix string "652" is thus used to formulate a range query to search for the permuted keyword strings in the permuterm index.

Figure 7:
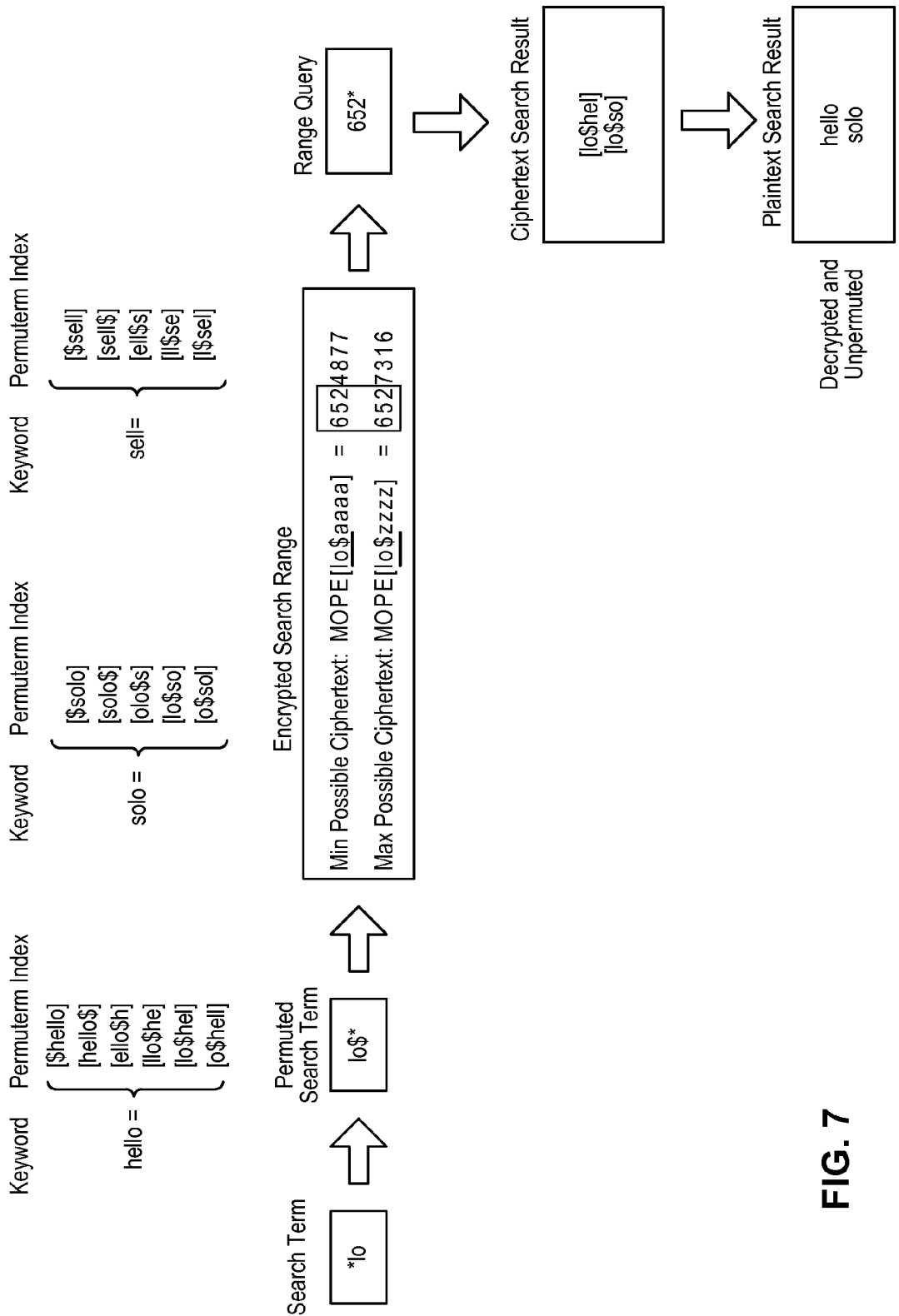
FIG. 7 illustrates the operation of the encrypted text wildcard search method in some examples of the present invention.

FIG. 7 illustrates the operation of the encrypted text wildcard search method in some examples of the present invention. Referring to FIG. 7, in the present example, it is assumed that the permuterm index has stored there on encrypted permuted keyword strings associated with the keywords "hello", "solo", and "sell". A suffix search term "lo" is received. The permuted search term "lo$*" is generated. The minimum and maximum plaintext search strings are formed and encrypted using the MOPE encryption algorithm. The common ciphertext prefix string is determined to be "652". A range query using the common ciphertext prefix string "652" is formulated to index the permuterm index. The permuterm index returns the search result containing encrypted permuted keyword strings "[lo$hel]" and "[lo$so]" having ciphertext values falling within the range query.

In some embodiment, post processing can be performed on the search result. For example, the encrypted permuted keyword strings obtained from the permuterm index can be decrypted and unpermuted to obtain the plaintext keyword strings associated with search result. In the present description, unpermuting a permuted keyword string refers to rotating the characters of the permuted keyword string, using the first character delimiter as reference, until the first character of the plaintext keyword string is at the first position. For example, the permuted keyword string "lo$hel" is unpermuted to "$hello" and the first character delimiter can then be removed to obtain the plaintext keyword "hello". In another example, the permuted keyword string "lo$so" is unpermuted to "$solo" and the first character delimiter can then be removed to obtain the plaintext keyword "solo". In the present example, the plaintext keywords "hello" and "solo" are obtained. The plaintext keyword search result indicates that there are encrypted documents stored in the cloud service provider that contain these plaintext keywords that matches the suffix search query of "*lo". With the plaintext search result thus obtained, various methods can be used to retrieve the relevant documents.

Figure 8:
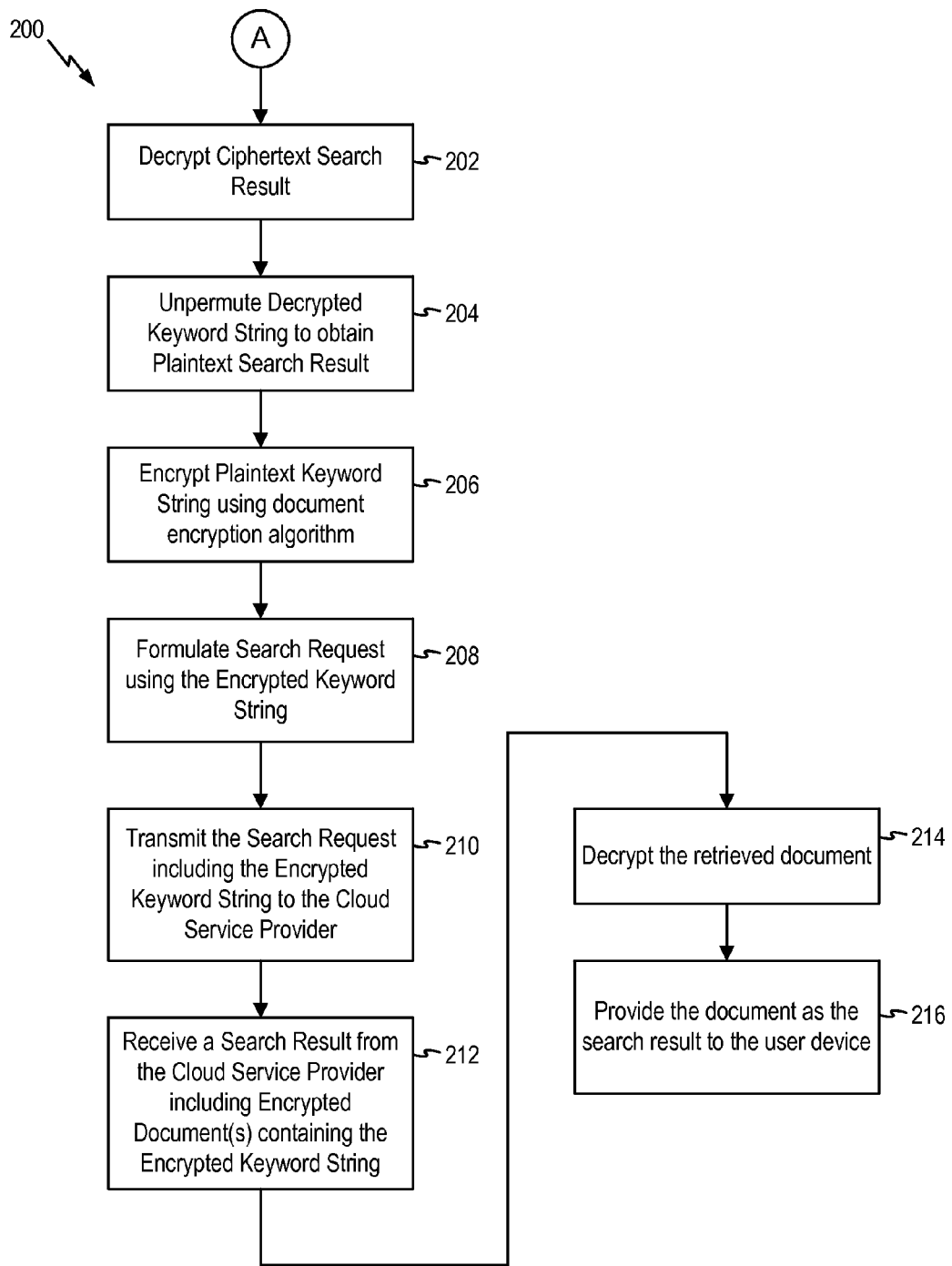
FIG. 8 is a flowchart illustrating one method for retrieving the relevant documents after obtaining the ciphertext search result using the encrypted text wildcard search method in some embodiments.

FIG. 8 is a flowchart illustrating one method for retrieving the relevant documents after obtaining the ciphertext search result using the encrypted text wildcard search method in some embodiments. Referring to FIG. 8, a method 200 commences at point A which is the end of step 168 of the encrypted text wildcard search method 150. At the start of method 200, ciphertext search result in the form of one or more encrypted permuted keyword strings are retrieved from the permuterm index as a result of a wildcard search query. At 202, the ciphertext search result is decrypted. That is, the encrypted permuted keyword strings retrieved from the permuterm index are decrypted. The decrypted keyword strings are then unpermuted to obtain the plaintext keyword strings as the plaintext search result (204). With the plaintext keyword strings thus obtained, the method 200 proceeds to encrypt the plaintext keyword strings using the document encryption algorithm (206). The method 200 then formulates a search request using the encrypted keyword strings (208). The method 200 transmits the search request including the encrypted keyword strings to the cloud service provider (210). The cloud service provider may use its native search function to search the stored encrypted files for the encrypted keyword strings. At 212, the method 200 receives a search result from the cloud service provider including encrypted document(s) containing the encrypted keyword strings. The method 200 then decrypts the retrieved document(s) (214) and provides the decrypted document(s) as the search result to the user device (216).

Figure 9:
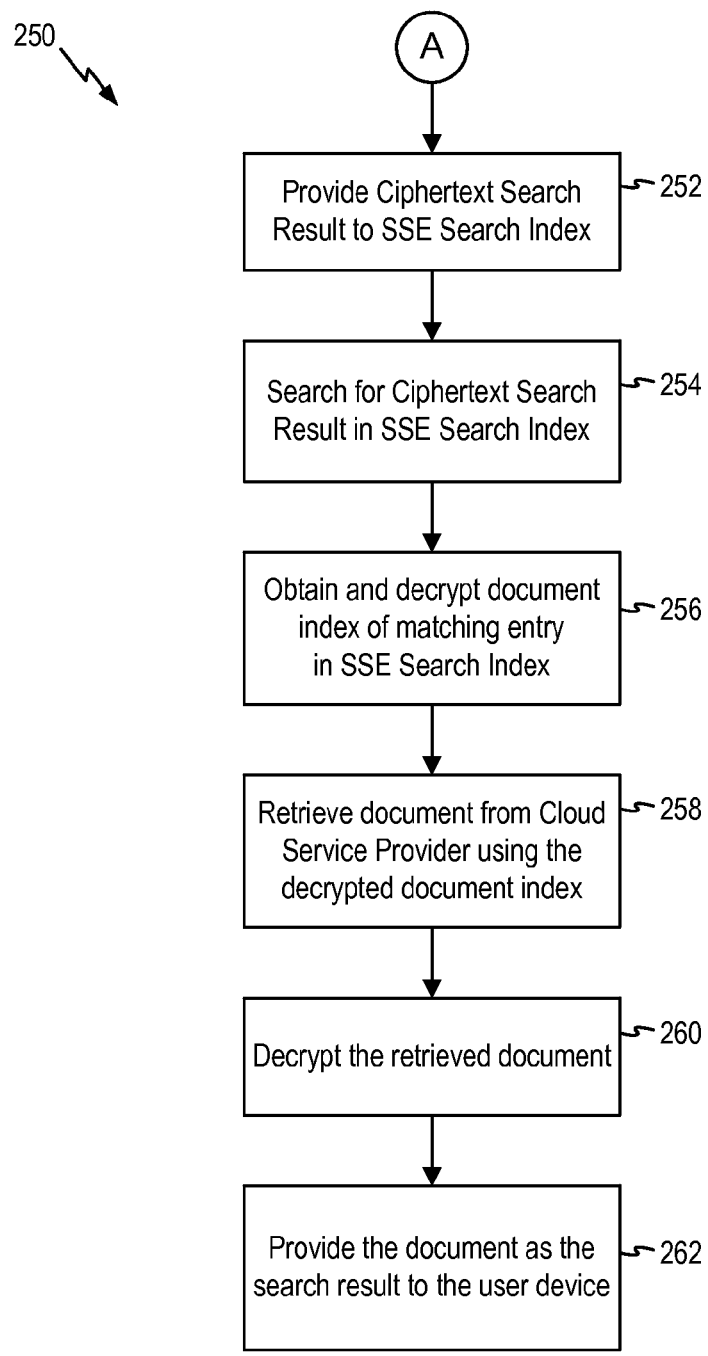
FIG. 9 is a flowchart illustrating an alternate method for retrieving the relevant documents after obtaining the ciphertext search result using the encrypted text wildcard search method in some embodiments.

FIG. 9 is a flowchart illustrating an alternate method for retrieving the relevant documents after obtaining the ciphertext search result using the encrypted text wildcard search method in some embodiments. Referring to FIG. 9, a method 250 commences at point A which is the end of step 168 of the encrypted text wildcard search method 150. At the start of method 200, ciphertext search result in the form of one or more encrypted permuted keyword strings are retrieved from the permuterm index as a result of a wildcard search query. At 252, the ciphertext search result is provided to a searchable symmetric encryption (SSE) search index. The method 250 searches for the ciphertext search result in the SSE search index (254). The method 250 then obtains and decrypts document index of matching entry in the SSE search index (256). The method 250 then retrieves the document from the cloud service provider using the decrypted document index (258). The method 250 then decrypts the retrieved document(s) (260) and provides the decrypted document(s) as the search result to the user device (262).

FIG. 10 illustrates example pseudocodes which can be used to implement the encrypted text wildcard search method in embodiments of the present invention. Algorithm 1 illustrates the pseudocodes for processing a keyword "str" and inserting the encrypted permuted keyword strings into the permuterm index. Algorithm 2 illustrates the pseudocodes for searching for a query Q in the encrypted permuterm index.

In FIG. 10, the definitions for the following terms are used:

Permuterm(s) is a function that takes a string and returns a set of permuted strings suitable for insertion into the permuterm index.

MOPE(k, s) is a function that encrypts a string using modular order-preserving encryption and the key k.

Pad(s, len) is a function that right-pads the string s to length len with some special character defined as less than all other characters in the alphabet.

LowerPad(s, len) is a function that right-pads the string s to length len with the lexicographically least character in the alphabet.

UpperPad(s, len) is a function that right-pads the string s to length len with the lexicographically greatest character in the alphabet.

RangeQ(DB, lower, upper) is a function that returns all values from DB in the range [lower, upper].

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for performing wildcard search of encrypted cloud stored data comprising:

receiving, at a network intermediary, a document destined for a cloud service provider;

encrypting, at a network intermediary, the document using a document encryption algorithm;

generating a set of permuted keyword strings for each of some or all of the keywords in the document, the set of permuted keyword strings for each keyword being generated by adding a first character delimiter before the first character of the keyword and applying cyclic rotation of the characters of the keyword, including the first character delimiter;

encrypting the permuted keyword strings using an order preserving encryption algorithm;

storing the encrypted permuted keyword strings in a database;

transmitting the encrypted document to the cloud service provider;

receiving, at a network intermediary, a search request with a search term directed to encrypted documents stored in a cloud service provider, the search term comprising a wildcard search term;

transforming the wildcard search term to a permuted search term having a prefix search format;

generating a minimum possible plaintext string using the permuted search term as prefix and padding the permuted search term to a first character length using one or more trailing characters indicative of a minimum possible value related to the search term;

generating a maximum possible plaintext string using the permuted search term as prefix and padding the permuted search term to the first character length using one or more trailing characters indicative of a maximum possible value related to the search term;

encrypting the minimum possible plaintext string and the maximum possible plaintext string using the order-preserving encryption algorithm used to encrypt the permuted keyword strings;

generating a minimum ciphertext from the minimum possible plaintext string and a maximum ciphertext from the maximum possible plaintext string;

determining a set of common leading digits from the minimum ciphertext and the maximum ciphertext;

generating a range query including the set of common leading digits;

sending the range query to the database of encrypted permuted keyword strings; and receiving a search result from the database including encrypted permuted keyword strings having ciphertext values that fall within the range query.

2. The method of claim 1, wherein encrypting, at a network intermediary, the document using a document encryption algorithm comprises:

encrypting, at a network intermediary, the document using an AES256-GCM authenticated encryption algorithm.

3. The method of claim 1, wherein encrypting the permuted keyword strings using an order preserving encryption algorithm comprises:

encrypting the permuted keyword strings using a modular order preserving encryption algorithm.

4. The method of claim 1, wherein the wildcard search term comprises one of a prefix search term, a suffix search term, an inner-wildcard search term, a substring search and a multiple wildcard search term, the wildcard search term being a character string including a wildcard term; and wherein transforming the search term to a permuted search term having a prefix search format comprises adding the first character delimiter to the character string of the wildcard search term and rotating the characters of the character string until the wildcard term is at an end of the character string.

5. The method of claim 1, further comprising:

decrypting the encrypted permuted keyword strings in the search result using the order preserving encryption algorithm; and unpermuting, using the first character delimiter, the decrypted permuted keyword strings to obtain plaintext keyword strings with the first character of each plaintext keyword string in a first position in the plaintext keyword string.

6. The method of claim 5, further comprising:
encrypting the plaintext keyword strings of the search result using the document encryption algorithm;
formulating a second search request using the encrypted keyword strings;
transmitting the second search request including the encrypted keyword strings to the cloud service provider;
receiving a second search result including an encrypted document stored in the cloud service provider having an encrypted text matching at least one of the encrypted keyword strings;
decrypting the returned encrypted document; and
providing the decrypted document in response to the search request.

7. The method of claim 1, further comprising:
providing the encrypted permuted keyword strings of the search result to a searchable encryption search index;
searching for the encrypted permuted keyword strings in the searchable encryption search index;
retrieving from the search index an encrypted document index mapped to a matching encrypted permuted keyword string;
decrypting the encrypted document index;
retrieving an encrypted document from the cloud service provider using the decrypted document index;
decrypting the retrieved document; and
providing the decrypted document in response to the search request.

8. The method of claim 1, wherein generating a minimum plaintext string using the permuted search term as prefix and padding the permuted search term to a first character length using one or more trailing characters indicative of a minimum possible value related to the search term comprises:
determining the character type of the permuted search term; and
padding one or more trailing characters to the permuted search term using the minimum possible value associated with the character type of the permuted search term.

9. The method of claim 1, wherein generating a maximum plaintext string using the permuted search term as prefix and padding the permuted search term to the first character length using one or more trailing characters indicative of a maximum possible value related to the search term comprises:
determining the character type of the permuted search term; and
padding one or more trailing characters to the permuted search term using the maximum possible value associated with the character type of the permuted search term.

10. A system for performing wildcard search of encrypted cloud stored data, comprising:
a network proxy server, comprising a hardware computer system, configured as a network intermediary between a user device and a cloud service provider storing encrypted files on behalf of the user device; and
a database in communication with the network proxy server,
wherein the network proxy server is configured to receive a document destined for the cloud service provider, to encrypt the document using a document encryption algorithm, to generate a set of permuted keyword strings for each of some or all of the keywords in the document, the set of permuted keyword strings for each keyword being generated by adding a first character delimiter before the first character of the keyword and applying cyclic rotation of the characters of the keyword, including the first character delimiter, to encrypt the permuted keyword strings using an order preserving encryption algorithm, to store the encrypted permuted keyword strings in the database, and to transmit the encrypted document to the cloud service provider; and
wherein the network proxy server is further configured to receive a search request with a search term directed to encrypted documents stored in a cloud service provider, the search term comprising a wildcard search term, to transform the search term to a permuted search term having a prefix search format, to generate a minimum possible plaintext string using the permuted search term as prefix and padding the permuted search term to a first character length using one or more trailing characters indicative of a minimum possible value related to the search term, to generate a maximum possible plaintext string using the permuted search term as prefix and padding the permuted search term to the first character length using one or more trailing characters indicative of a maximum possible value related to the search term, to encrypt the minimum possible plaintext string and the maximum possible plaintext string using the order-preserving encryption algorithm used to encrypt the permuted keyword strings, to generate a minimum ciphertext from the minimum possible plaintext string and a maximum ciphertext from the maximum possible plaintext string, to determine a set of common leading digits from the minimum ciphertext and the maximum ciphertext, to generate a range query including the set of common leading digits, to send the range query to the database of encrypted permuted keyword strings, and to receive a search result from the database including encrypted permuted keyword strings having ciphertext values that fall within the range query.

11. The system of claim 10, wherein the network proxy server is further configured to encrypt the document using an AES256-GCM authenticated encryption algorithm.

12. The system of claim 10, wherein the network proxy server is further configured to encrypt the permuted keyword strings using a modular order preserving encryption algorithm.

13. The system of claim 10, wherein the wildcard search term comprises one of a prefix search term, a suffix search term, an inner-wildcard search term, a substring search and a multiple wildcard search term, the wildcard search term being a character string including a wildcard term; and
wherein the network proxy server is further configured to transform the wildcard search term to a permuted search term having a prefix search format by adding the first character delimiter to the character string of the wildcard search term and rotating the characters of the character string until the wildcard term is at an end of the character string.

14. The system of claim 10, wherein the network proxy server is further configured to decrypt the encrypted permuted keyword strings in the search result using the order preserving encryption algorithm and to unpermute, using the first character delimiter, the decrypted permuted keyword strings to obtain plaintext keyword strings with the first character of each plaintext keyword string in a first position in the plaintext keyword string.

\* \* \* \* \*